United States Patent
Cho et al.

(10) Patent No.: US 9,877,151 B2
(45) Date of Patent: Jan. 23, 2018

(54) METHOD AND ELECTRONIC DEVICE FOR MEASURING POSITION

(71) Applicant: Samsung Electronics Co., Ltd., Gyeonggi-do (KR)

(72) Inventors: Sungrae Cho, Gyeonggi-do (KR); Jinwoo Kim, Seoul (KR); Seokhwan Park, Gyeonggi-do (KR); Youngpo Lee, Seoul (KR); Chaeman Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 14 days.

(21) Appl. No.: 15/160,670

(22) Filed: May 20, 2016

(65) Prior Publication Data

US 2016/0353236 A1 Dec. 1, 2016

(30) Foreign Application Priority Data

May 27, 2015 (KR) ........................ 10-2015-0074197

(51) Int. Cl.
*H04W 4/02* (2009.01)
*G01S 5/02* (2010.01)
*H04W 64/00* (2009.01)
*H04W 88/06* (2009.01)

(52) U.S. Cl.
CPC ............. *H04W 4/02* (2013.01); *G01S 5/0257* (2013.01); *H04W 64/00* (2013.01); *H04W 4/023* (2013.01); *H04W 88/06* (2013.01)

(58) Field of Classification Search
CPC ....... H04W 4/02; H04W 64/00; H04W 4/023; H04W 88/06; H04W 16/14; G01S 5/0257
USPC ............ 455/456.3, 456.1, 457, 456.5, 456.6, 455/456.2, 67.11
See application file for complete search history.

(56) References Cited

U.S. PATENT DOCUMENTS

| | | | |
|---|---|---|---|
| 7,366,492 B1 * | 4/2008 | Ganesh | G01S 5/0205 455/404.2 |
| 8,326,326 B2 | 12/2012 | Li et al. | |
| 8,339,316 B1 | 12/2012 | Mendis | |
| 8,447,327 B2 | 5/2013 | Escolar-Piedras et al. | |
| 8,478,297 B2 | 7/2013 | Morgan et al. | |
| 8,510,041 B1 | 8/2013 | Anguelov et al. | |
| 8,526,967 B2 | 9/2013 | Alizadeh-Shabdiz et al. | |
| 8,588,810 B2 | 11/2013 | Dai et al. | |
| 8,624,725 B1 | 1/2014 | MacGregor | |
| 8,635,023 B2 * | 1/2014 | Friedler | G01C 21/20 455/456.1 |

(Continued)

FOREIGN PATENT DOCUMENTS

KR 10-2012-0043854 5/2012

*Primary Examiner* — Charles Appiah
*Assistant Examiner* — Margaret G Mastrodonato
(74) *Attorney, Agent, or Firm* — The Farrell Law Firm, P.C.

(57) ABSTRACT

The present disclosure relates to a method and an electronic device for measuring a position of the electronic device. The method includes identifying radio stations of different communication networks based on different communication signals transmitted from the radio stations, identifying at least one grid in a plurality of grids corresponding to the identified radio stations, and identifying the position of the electronic device based on the identified at least one grid, wherein the plurality of grids correspond to a plurality of areas generated on a basis of intensities of the different communication signals.

10 Claims, 13 Drawing Sheets

(56) References Cited

U.S. PATENT DOCUMENTS

| | | | |
|---|---|---|---|
| 8,700,057 B2 | 4/2014 | Jovicic et al. | |
| 2013/0029685 A1 | 1/2013 | Moshfeghi | |
| 2013/0317944 A1* | 11/2013 | Huang | G01S 5/0252 |
| | | | 705/26.61 |
| 2017/0238131 A1* | 8/2017 | Dai | H04W 4/02 |
| | | | 455/456.1 |

* cited by examiner

METHOD AND ELECTRONIC DEVICE FOR MEASURING POSITION

PRIORITY

This application claims priority under 35 U.S.C. §119(a) to Korean Application Serial No. 10-2015-0074197, which was filed in the Korean Intellectual Property Office on May 27, 2015, the entire content of which is incorporated herein by reference.

BACKGROUND

1. Field of the Disclosure

The present disclosure relates generally to a method and an electronic device for measuring a position.

2. Description of the Related Art

Due to the prevalence of various technologies, the spread of smart phones, and the requirements of users, the necessity of position tracking using an electronic device has increased. A position of the electronic device is measured outdoors based on triangulation and a finger print on the basis of a signal transmitted from three or more base stations.

However, measuring a position of the electronic device using triangulation and a finger print has a problem in that it is hard to measure an accurate position of the electronic device when the electronic device is indoors.

SUMMARY

The present disclosure has been made to address at least the above-mentioned problems and/or disadvantages and to provide at least the advantages described below.

Accordingly, an aspect of the present disclosure is to provide a method and an electronic device for measuring a position. The method and the electronic device measure a position so as to generate a plurality of grids on the basis of intensities of communication signals detected by the electronic device, and identify the position of the electronic device using intensities of communication signals identified in the plurality of grids, and the intensities of communication signals detected by the electronic device.

Accordingly, another aspect of the present disclosure is to provide a method and an electronic device for measuring a position of the electronic device using an intensity of a communication signal identified in a plurality of grids generated on the basis of an intensity of a communication signal detected by the electronic device, and an intensity of a communication signal detected by the electronic device, thereby improving accuracy of the position measurement of the electronic device.

In accordance with an aspect of the present disclosure, there is provided a method of measuring a position. The method includes identifying radio stations of different communication networks based on different communication signals transmitted from the radio stations, identifying at least one grid in a plurality of grids corresponding to the identified radio stations, and identifying the position of the electronic device based on the identified at least one grid, wherein the plurality of grids correspond to a plurality of areas generated on a basis of intensities of the different communication signals.

In accordance with another aspect of the present disclosure, there is provided an electronic device for measuring a position. The electronic device includes a communication unit that detects different communication signals transmitted from radio stations of different communication networks, and a controller that identifies at least one grid in a plurality of grids corresponding to the detected radio stations, and identifies the position of the electronic device based on the identified at least one grid, wherein the plurality of grids correspond to a plurality of areas generated on a basis of intensities of the different communication signals.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
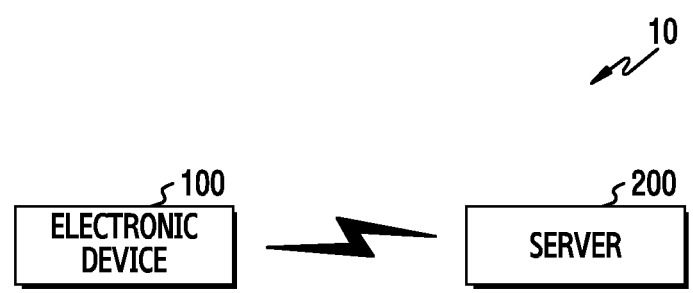
FIG. 1 is a block diagram of a position measurement system using a communication signal transmitted from radio stations of different communication networks, according to an embodiment of the present disclosure.

Hereinafter, certain embodiments of the present disclosure will be described in detail with reference to the accompanying drawings, where like reference numerals are used to refer to like structural elements. The detailed description of known functions and structures will be omitted so as not to obscure the subject matter of the present disclosure.

FIG. 1 is a block diagram of a position measurement system using a communication signal transmitted from radio stations of different communication networks, according to an embodiment of the present disclosure.

Referring to FIG. 1, a positioning system 10 using different wireless communication networks includes an electronic device 100 and a server 200.

The electronic device 100 receives a communication signal transmitted from radio stations of different communication networks. The electronic device 100 identifies radio stations which are transmitting communication signals detected at a current position of the electronic device 100, and transmits information on the identified radio stations to the server 200.

The electronic device 100 accesses a first radio station transmitting a first communication signal for performing first communication with an external device. The first radio station which the electronic device 100 accesses may be a serving radio station. The electronic device 100 detects a first communication signal transmitted from another first radio station, with the exception of the serving radio stations, in a current position. The other first radio station may be a neighbor radio station. The external device may include the server 200, an accessory device, and another electronic device.

The electronic device 100 identifies at least one second radio station transmitting a second communication signal detected in the current position.

In the embodiment of the present disclosure, different communication networks may include a data communication network such as long term evolution (LTE), a mobile communication network transmitting the first communication signal through a base station, such as code division multiple access (CDMA), time division multiple access (TDMA), frequency division multiple access (FDMA), and orthogonal frequency division multiple access (OFDMA), and short-range wireless communication network, such as WiFi, transmitting the second communication signal through an access point (AP).

In the embodiment of the present disclosure, the first communication refers to data communication such as LTE, and mobile communication transmitting the first communication signal through a base station such as CDMA, TDMA, FDMA, and OFDMA, and the second communication refers to short-range wireless communication, such as WiFi, transmitting the second communication signal through an AP.

Further, a radio station used in the embodiment of the present disclosure is used by a base station and an AP.

According to an embodiment, the electronic device 100 identifies a serving radio station accessed from the current position, and identifies at least two neighbor radio stations. The electronic device 100 collects information on three or more detected first radio stations and then transmits the collected information to the server 200.

According to an embodiment, the electronic device 100 identifies the serving radio station accessed in the current position. When a first communication signal, which is being transmitted from the at least two neighbor radio stations, has not been detected, the electronic device 100 identifies at least one second radio station which is transmitting a second communication signal detected at the current position. The electronic device 100 collects information on the identified serving radio station and information on the at least one second radio station, and then transmits the collected information to the server 200.

The information on the radio station includes an intensity of a communication signal detected by the electronic device 100, and identification information of a radio station transmitting a communication signal detected by the electronic device 100.

The server 200 extracts grid information corresponding to information on a radio station, received from the electronic device 100, and generate a grid DB. To this end, the server 200 may store the grid DB. The server 200 collects grid information through crowd sourcing using an exclusive program for generating a grid or at least one different electronic device. The server 200 maps the collected grid information to generated grids, and generates and stores the grid DB.

The grids divide a plurality of cells formed on the basis of the first communication into a regular size, and then generate the cell. The grid DB is formed by grid information including a grid point, an intensity of a first communication signal identified in the grid point, and an intensity of a second communication signal identified in the grid point. The grid point is an absolute coordinate value for a center point of one grid.

The server 200 identifies information on a radio station, received from the electronic device 100. The server 200 identifies identification information of a radio station of information on the radio station. The server 200 extracts grid information included in a coverage of a communication signal transmitted from the radio station. The server 200 transmits the extracted grid information to the electronic device 100.

The electronic device 100 receives the grid information extracted from the server 200. The electronic device 100 identifies a position of the electronic device 100 on the basis of the at least one received grid information, and displays the position.

The electronic device 100 obtains a difference between an intensity of a communication signal of a grid included in the received grid information and an intensity of a communication signal detected by the electronic device 100. The electronic device 100 identifies a grid of which a differential value of the intensities of communication signals is near to 0. The electronic device 100 calculates a spacing distance between a grid point for the identified grid and the electronic device 100. The electronic device 100 considers the calculated spacing distance and a direction in which a radio station, which is transmitting a communication signal in which a differential value near to 0, is located, thereby identifying the position of the electronic device 100. The electronic device 100 displays the identified position.

Figure 2:
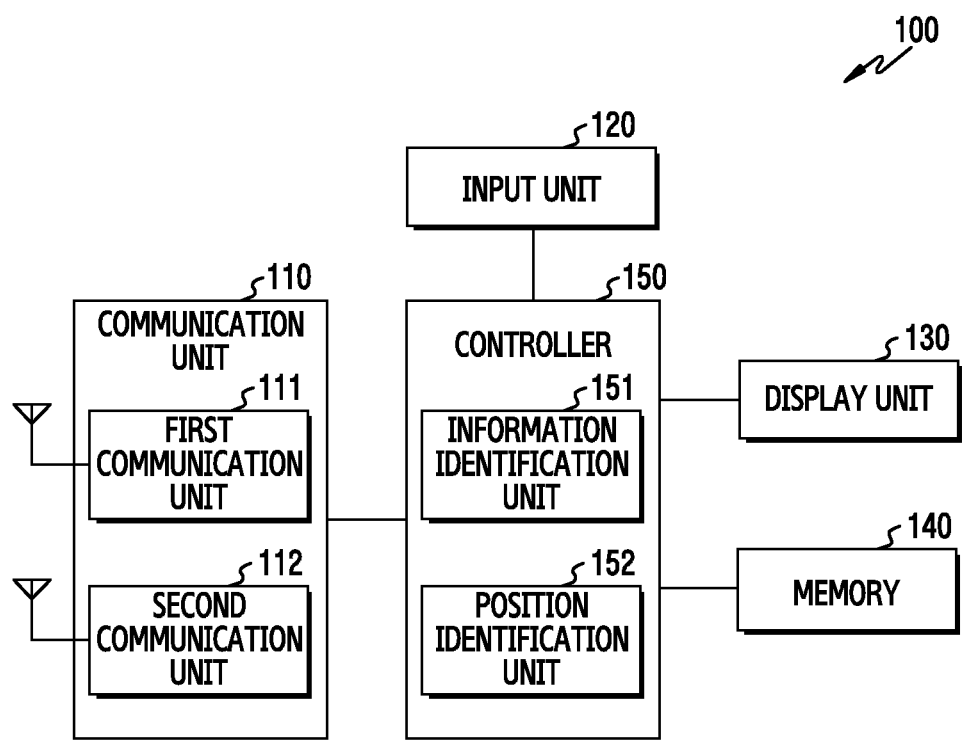
FIG. 2 is a block diagram of a configuration of an electronic device for measuring a position using a communication signal transmitted from different communication networks, according to an embodiment of the present disclosure.

FIG. 2 is a block diagram of a configuration of the electronic device for measuring a position using the communication signal transmitted from radio stations of different communication networks, according to an embodiment of the present disclosure.

Referring to FIG. 2, an electronic device 100 according to an embodiment of the present disclosure includes a communication unit 110, an input unit 120, a display unit 130, a memory 140, and a controller 150.

The communication unit 110 performs communication in the electronic device 100. The communication unit 110 communicates with a server 200, an accessory device, and an external device, including another electronic device, in various communication schemes. The communication unit 110 performs at least one of wireless communication and wired communication, and receives communication signals transmitted from radio stations of different communication networks. To this end, the communication unit 110 accesses a first communication network through a first communication unit 111, and accesses a second communication network through a second communication unit 112.

The first communication network 111 may be a data communication network, such as an LTE transmitting the first communication signal through a base station, and a mobile communication network, such as CDMA, TDMA, FDMA, and OFDMA. The second communication network 112 may be a short-range distance wireless communication network, such as Wi-Fi, transmitting the second communication signal through an Access Point (AP).

The input unit 120 generates the input data corresponding to a user's input to the electronic device 100. The input unit 120 includes at least one input means. The input unit 120 may include a key pad, a dome switch, a physical button, a touch panel, and a jog & shuttle.

The display unit 130 displays a screen according to an operation of the electronic device 100 under a control of the controller 150. The display unit 130 may include a liquid crystal display (LCD), a light emitting diode (LED) display, an organic LED (OLED) display, a micro electro mechanical system (MEMS) display, and an electronic paper display. The display unit 130 may include different light emitting devices. The display unit 130 displays an identified position of the electronic device 100 under the control of the controller 150.

The memory 140 stores operation programs of the electronic device 100. The memory 140 stores programs for identifying a position of the electronic device 100.

The controller 150 identifies first radio stations or second radio stations which transmit a first communication signal or a second communication signal. The controller 150 transmits, to the server 200, information on the identified first radio stations or second radio stations.

The controller 150 receives, from the server 200, grid information corresponding to information on the radio stations transmitting the information. The controller 150 identifies the position of the electronic device 100 on the basis of the received grid information. To this end, the controller 150 includes an information identification unit 151 and a position identification unit 152.

When a positioning function execution signal, which is required to measure a position of the electronic device 100, has been received through the input unit 120, the information identification unit 151 identifies information of a serving radio station, which the electronic device 100 accesses, among first radio stations transmitting the first communication signal. Although the electronic device 100 is not accessed, when a neighbor radio station, which is transmitting the first communication signal detected by the first communication unit 111, has been additionally discovered, the electronic device 100 may identify information of the neighbor radio station. The information identification unit 151 identifies an intensity of the first communication signal detected by the first communication unit 111, and identification information of the serving radio station and the neighbor radio station.

When a neighbor radio station has not been discovered, the information identification unit 151 activates the second communication unit 112 to detect the second communication signal. The electronic device 100 identifies information of the at least one second radio station which is transmitting the second communication signal detected by the second communication unit 112. The electronic device 100 identifies an intensity of the second communication signal detected by the second communication unit 112, and identification information on the at least one second radio station.

The information identification unit 151 transmits, to the server 200, information on at least one of the identified first radio stations or second radio stations.

The position identification unit 152 measures the position of the electronic device 100 on the basis of the grid information received from the server 200. When the grid information received from the server 200 corresponds to information on one grid, the position identification unit 152 configures the position of the one grid as the position of the electronic device 100.

For example, when the received grid information corresponds to information on the plurality of grids, the position identification unit 152 identifies intensities of communication signals in the plurality of grids. The position identification unit 152 identifies the intensities of communication signals detected in the electronic device 100. The position identification unit 152 obtains a difference between intensities of communication signals identified in the grids and the intensities of communication signals detected by the electronic device 100. The position identification unit 152 calculates a spacing distance between a grid point and the electronic device 100, using the calculated differential value. The position identification unit 152 measures a position of the electronic device using the calculated spacing distance.

According to an embodiment, when the grid information received from the server 200 corresponds to information on the plurality of grids, the position identification unit 152 extracts a specific grid from the plurality of grids. The position identification unit 152 configures the position of the extracted specific grid as the position of the electronic device 100.

For example, the position identification unit 152 identifies intensities of communication signals in the grids. The position identification unit 152 identifies the intensities of communication signals detected by the electronic device 100. The position identification unit 152 obtains a difference between intensities of communication signals in the grids and intensities of communication signals detected by the electronic device 100. The position identification unit 152 extracts a grid, in which the calculated differential value is the smallest, as the specific grid. The position identification unit 152 calculates a spacing distance between a grid point of the specific grid and the electronic device 100, using the calculated differential value. The position identification unit 152 identifies a position of the electronic device 100 using the calculated spacing distance.

Figure 3:
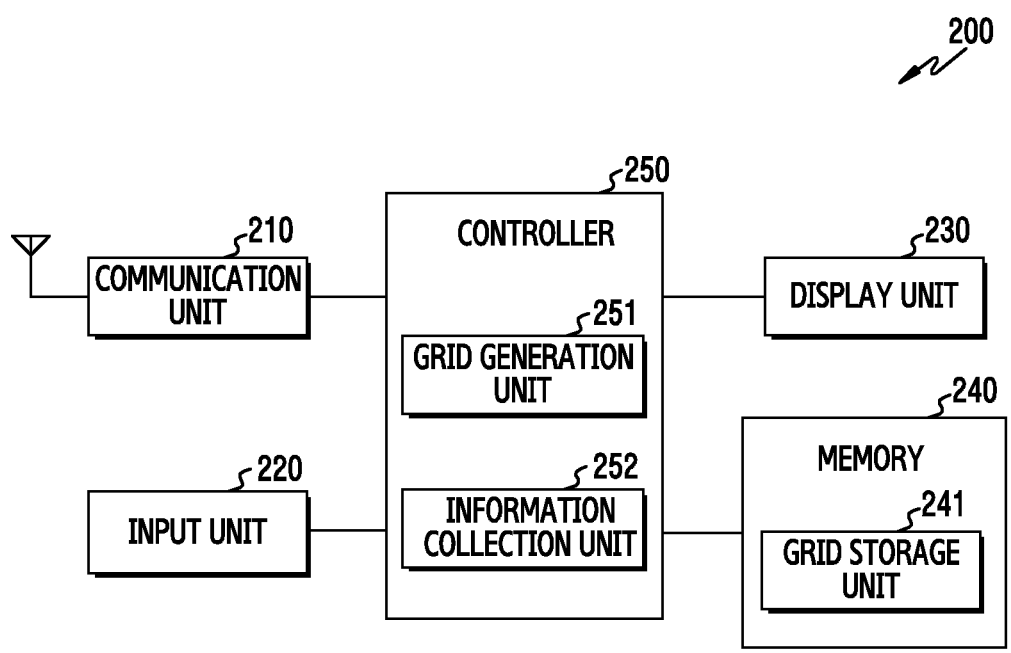
FIG. 3 is a block diagram of a configuration of a server for measuring a position of an electronic device using a communication signal transmitted from radio stations of different communication networks, according to an embodiment of the present disclosure.

FIG. 3 is a block diagram of a configuration of a server for measuring a position of an electronic device using a communication signal transmitted from radio stations of different communication networks, according to an embodiment of the present disclosure.

Referring to FIG. 3, a server 200 according to an embodiment of the present disclosure includes a communication unit 210, an input unit 220, a display unit 230, a memory 240, and a controller 250.

The communication unit 210 performs communication in the server 200. The communication unit 210 communicates with an external device, such as the electronic device 100, in various communication schemes. The communication unit 210 performs at least one of wireless communication and wired communication.

The input unit 220 generates the input data corresponding to a user's input to the server 200. The input unit 220 includes at least one input means. The input unit 220 may include a key pad, a dome switch, a physical button, a touch panel, and a jog and shuttle control.

The display unit 230 displays a screen according to an operation of the server 200 under a control of the controller 250. The display unit 230 displays a grid DB generated under the control of the controller 250. The display unit 230 may include an LCD, an LED display, an OLED display, a MEMS display, and an electronic paper display. The display unit 230 may include different light emitting devices.

The memory 240 stores operation programs of the server 200. The memory 240 stores a program for generating a grid. Specifically, the memory 240 stores information on a plurality of grids for identifying the position of the electronic device 100. To this end, the memory 240 includes a grid storage unit 241.

The controller 250 divides a plurality of cells formed on the basis of the first communication into a regular size, and then generates a plurality of grids. The controller 250 collects information on the generated grids. The controller 250 maps the collected information and grids and then stores the generated grid DB in a grid storage unit 241. The controller 250 transmits grid information to the electronic device 100 so as to measure a position by the electronic device 100. To this end, the memory 250 includes the grid generation unit 251 and an information collection unit 252.

The grid generation unit 251 divides a plurality of cells formed on the basis of the first communication into a regular size, and then generates a plurality of grids. For example, the grids may be generated in a form of a quadrangle configured by a 20×20 size, and the size of the grid be changed by a user of the server 200.

The grid generation unit 251 allocates a grid ID for each of generated grids, and configures a center point of a grid as a grid point. The grid point is a position representing a corresponding grid, and an absolute coordinate value may be allocated.

The information collection unit 252 collects information on grids through crowd sourcing, using at least one external device. Further, the information collection unit 252 collects additional information from at least one external device, including a global positioning system (GPS). The additional information includes a position of the external device, an intensity of a first communication signal or an intensity of a second communication signal which is detected at the position, and identification information of a first radio station or a second radio station transmitting the first communication signal or the second communication signal which is detected at the position of the external device.

The grid generation unit 251 maps the collected information in the information collection unit 252 to the generated grids to generate a grid DB and stores the grid DB in the grid storage unit 241.

The information collection unit 252 identifies a grid, in which the external device is located, among a plurality of grids using current position information of the external device. The information collection unit 252 updates the grid DB as grid information corresponding to the additional information.

The information collection unit 252 extracts, from the grid DB, grid information corresponding to at least one radio station of the first radio station and the second radio station received from the electronic device 100. The information collection unit 252 transmits the extracted grid information to the electronic device 100.

Figure 4:
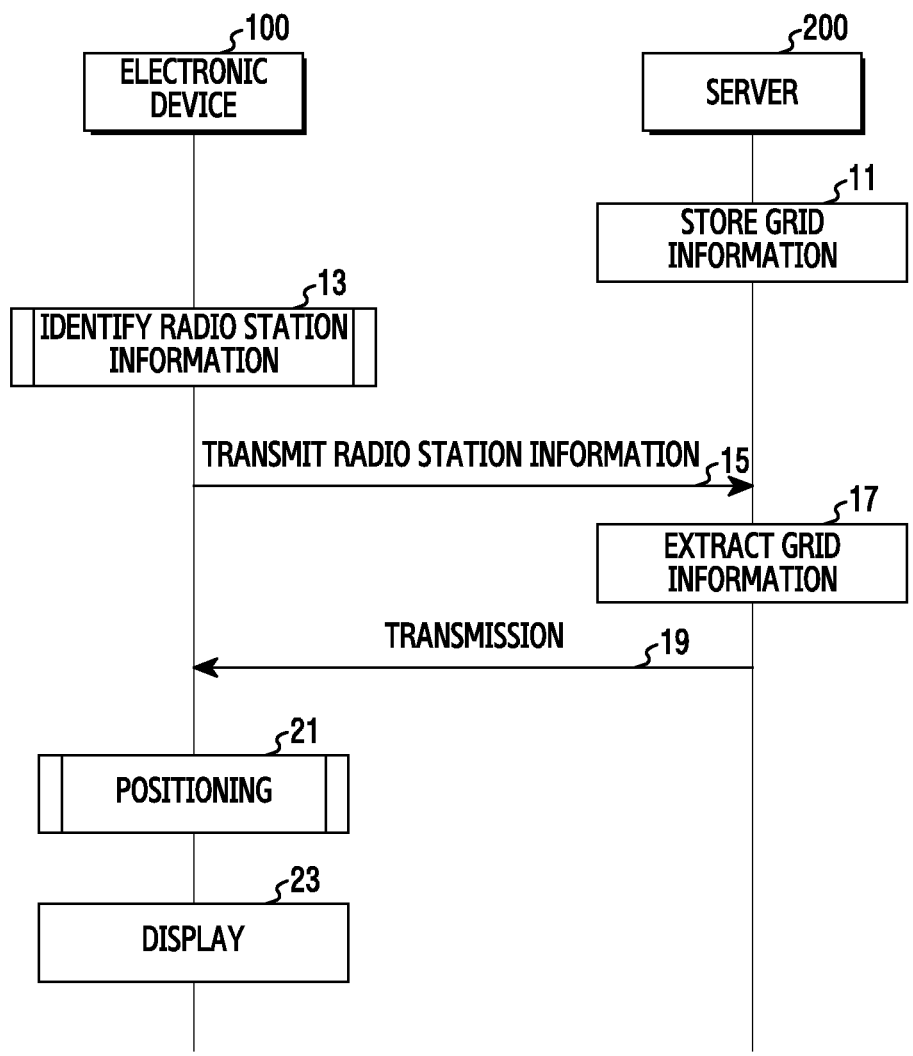
FIG. 4 is a flowchart of a method of measuring a position of an electronic device using a communication signal transmitted from radio stations of different communication networks, according to an embodiment of the present disclosure.

FIG. 4 is a flowchart illustrating a method of measuring a position of an electronic device using a communication signal transmitted from the radio stations of different communication networks, according to an embodiment of the present disclosure.

Referring to FIG. 4, in step 11, a server 200 stores grid information. The server 200 collects grid information as shown in Table 1 using an exclusive program for generating a grid, crowd sourcing using at least one external device, and additional information received from at least one external device including a GPS.

The grid information includes information which can identify a fixed physical position, such as a grid ID representing a communication signal intensity measured in a corresponding grid, an actual address of a corresponding grid or a corresponding grid point, a floor, a store number, a name

TABLE 1

| | |
|---|---|
| grid ID | grid ID - name/address (user input is possible) Grid position information |
| REF absolute coordinate | reference coordinate value of grid (user input is possible) |
| relative coordinate | relative position coordinate value from REF position (user input is possible) |
| | Serving cell information (number = 1) |
| MCC | Mobile country code |
| MNC | Mobile network code |
| LAC | Location area code |
| Cell ID | Serving cell ID |
| Physical Cell ID | Serving cell physical cell ID (PCI) |
| EARFCN | Frequency band |
| RSRP | Serving cell reference signal received power |
| Cell tower location | (option) serving cell tower altitude and longitude value and accuracy |
| | Neighbor cell information (number >= 0) neighbor cell(s) - if there is nothing, NULL |
| Physical Cell ID | Neighbor cell ID (NULL if unavailable) |
| EARFCN | Neighbor cell frequency band |
| RSRP | received signal strength(reception signal level) |
| | WiFi fingerprint(number >= 0) neighbor AP(s) (if the number of cells is sufficient, NULL) |
| SSID | SSID |
| macAddress | MAC Address |
| RSSI | Received signal strength indicator (reception signal level) |

According to an embodiment, the server 200 divides a plurality of cells formed on the basis of the first communication into a regular size, and then generates a plurality of grids. The grids may be generated in a form of a quadrangle having a specific size.

The server 200 configures a center point of a grid having the specific size as a grid point, and the grid point is a location representing a corresponding grid. A reference absolute coordinate value may be indicated as a latitude and longitude value, and is a representative absolute coordinate value corresponding to the grid point.

The server 200 may generate a grid in a public place or a specific building to register the grid. For example, when the grid is in the specific building, the grid point may be a representative absolute coordinate value ($P_x$, $P_y$) of the building. In this event, a relative position coordinate value ($p_x$, $p_y$) represents a relative moving distance to a reference absolute coordinate value ($R_x$, $R_y$) axis. The relative position coordinate value, as shown in Equation (1) below, may be converted as an absolute position coordinate value using the reference absolute coordinate value.

$$\begin{pmatrix} P_x \\ P_y \end{pmatrix} = \begin{pmatrix} \cos\theta & -\sin\theta \\ \sin\theta & \cos\theta \end{pmatrix} \begin{pmatrix} p_x \\ p_y \end{pmatrix} + \begin{pmatrix} R_x \\ R_y \end{pmatrix} \quad \text{Equation (1)}$$

The server 200 groups grids and is defined as a patch (or a tile). The server 200 configures an index on each patch, and determines, using Equations (2) and (3), a patch index in which a predetermined latitude and longitude coordinate value is included. The server 200 may identify the patch index using a latitude and longitude coordinate value for the grid point. In this event, a patch height degree and a patch width degree may be configured as 0.01, 0.02 or up to 0.1 degrees. The server 200 identifies a grid in which a predetermined position is included, by determining a patch index in which the predetermined position is included, through Equations (2) and (3) below.

Latitude index indexLat=floor[(latitude+90)/Patch height degree]

Longitude index indexLon=floor[(longitude+180)/ Patch width degree]  Equation (2)

Where floor(x) may abandon a point value of x.

Equation (3) refers to a latitude and longitude reference (Ref) coordinate value in the left-lower end of a patch corresponding to the indexLat/indexLon. Since the grid has a specific size, a latitude and longitude range in a corresponding patch index, and the number of grids included in the corresponding patch index may be identified.

Patch Ref latitude=indexLat*Patch height degree−90

Patch Ref Longitude=indexLon*Patch width degree− 180  Equation (3)

Where degree is a value obtained by considering a distance conversion formula.

The server 200 collects additional information from at least one external device, including a GPS. The additional information may include a position of the external device, an intensity of a first communication signal or an intensity of a second communication signal which is detected at the position, and identification information of a first radio station or a second radio station transmitting the first communication signal or the second communication signal which is detected at the position. The server 200 identifies a grid, in which the external device is located, among a plurality of grids using current position information of the external device. The server 200 updates information of the corresponding grid as the additional information.

In step 13, the electronic device 100 identifies information of a radio station.

Figure 5:
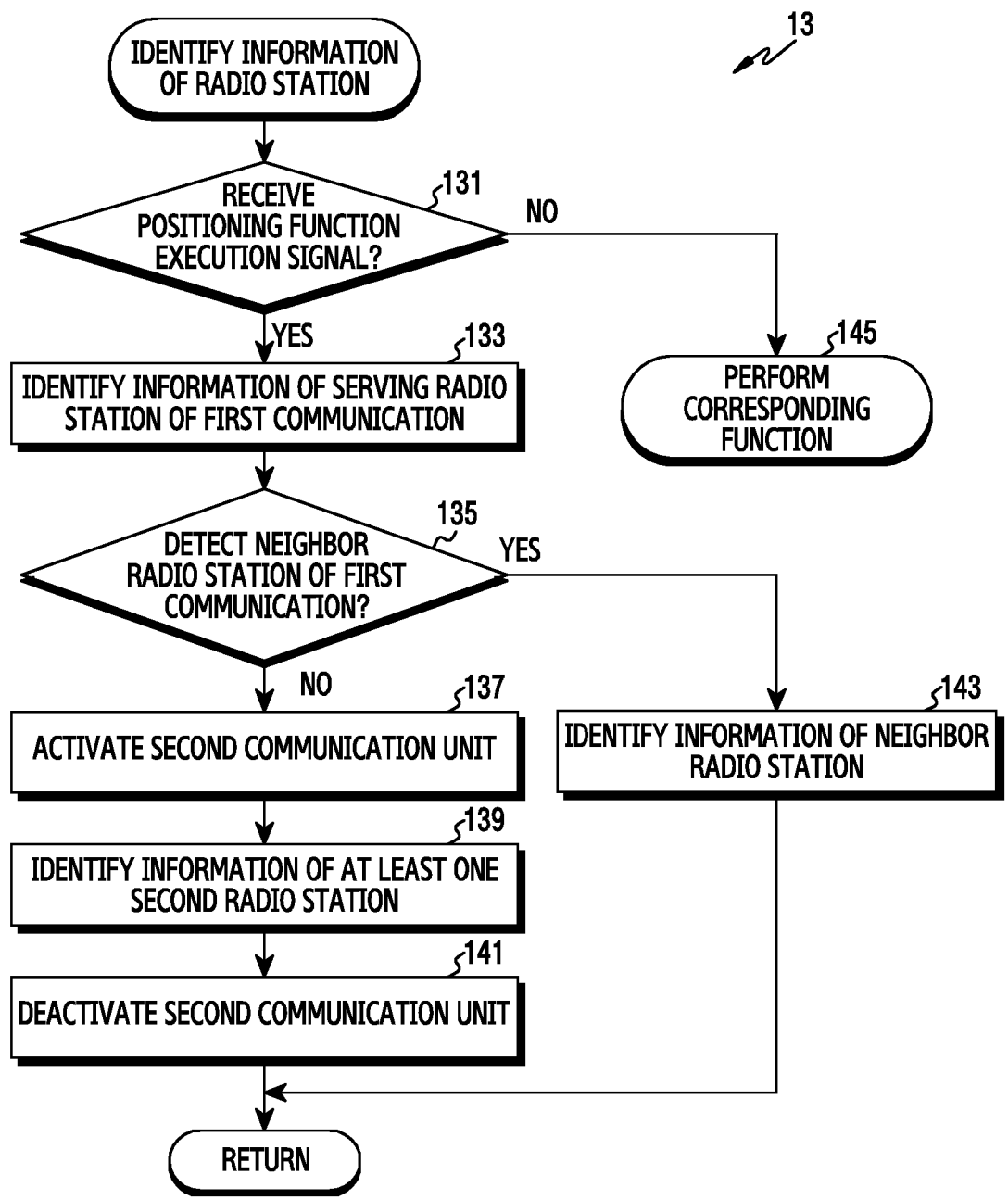
FIG. 5 is a flowchart of a method for identifying information of radio stations transmitting different communication signals by an electronic device, according to an embodiment of the present disclosure.

FIG. 5 is a flowchart of a method for identifying information of radio stations transmitting different communication signals by an electronic device, according to an embodiment of the present disclosure.

Referring to FIG. 5, in step 131, the electronic device 100 performs step 133 when a positioning function execution signal required to measure a position of the electronic device 100 has been received. When the positioning function execution signal has not been received in step 131, the electronic device 100 performs step 145.

In step 145, the electronic device 100 performs a corresponding function such as an idle screen output, and a specific application execution.

In step 133, the electronic device 100 identifies information of a serving radio station, which the electronic device 100 accesses, among first radio stations transmitting a first communication signal. The electronic device 100 identifies an intensity of the first communication signal detected at the current position, and identifies identification information of the serving radio station.

In step 135, when the electronic device 100, among the first radio stations transmitting the first communications signal, has not been accessed, but a neighbor radio station detecting the first communication signal has been detected, the electronic device performs step 143. Further, in step 135, the electronic device 100 performs step 143 when the neighbor radio station has been detected from the server 200 according to a request for detection of the neighbor radio station.

In step 143, the electronic device 100 identifies information of the neighbor radio station. In this event, at least two neighbor radio stations may be discovered. The electronic device 100 identifies an intensity of the first communication signal detected at the current position, and identifies identification information of the neighbor radio station. The electronic device 100 collects information of the identified serving radio station and neighbor radio station, and performs step 15.

In step 135, the electronic device 100 performs step 137 when the neighbor radio station has not been additionally discovered. In step 137, the electronic device 100 activates a second communication unit 112.

In step 139, when a second communication signal has been detected by the second communication unit 112, the electronic device 100 identifies information of at least one second radio station which is transmitting the second communication signal.

In step 141, when information of the second radio stations has been identified, the electronic device 100 deactivates the second communication unit 112.

The electronic device 100 identifies information on all second radio stations transmitting the detected second communication signal. The information on the second radio stations may include the intensity of the second communication signal detected by the electronic device 100, and identification information for the second radio station.

Referring back to FIG. 4, the electronic device 100 collects the detected information of the serving radio station in step 133 and the identified information of the second radio station in step 139, and then performs step 15.

In step 15, the electronic device 100 transmits the identified radio station information to the server 200. According an embodiment, in step 15, the electronic device 100 transmits three or more pieces of first radio station information to the server 200, or transmits, to the server 200, information of one first radio station and information of at least one second radio station.

In step 17, the server 200 extracts, from a grid DB, grid information corresponding to information on a radio station, received from the electronic device 100. According to an embodiment, the server 200 identifies identification information of the serving radio station and two or more neighbor radio stations, received from the electronic device 100. The server 200 identifies a coverage area of the first communication signal transmitted from each first radio station, according to the identified identification information of the first radio station. The server 200 extracts an area which is overlapped with the coverage area of the first communication signal transmitted from each of three or more first radio stations. The server 200 extracts the grid information corresponding to the extracted area.

In step 19, the server 200 transmits the extracted grid information to the electronic device 100.

According to an embodiment, the server 200 identifies identification information of a serving radio station and at least one second radio station by the electronic device 100. The server 200 identifies a coverage area of the first communication signal transmitted from the serving radio station, according to the identified identification information of the serving radio station. The server 200 identifies a coverage area of second communication signal transmitted from the second radio station, according to the identified identification information of the at least one second radio station.

The server 200 extracts an area in which the identified coverage area of the first communication signal is overlapped with a coverage area of the second communication signal. The server 200 extracts at least one grid included in the extracted area.

In step 19, the server 200 transmits information on the extracted grid, to the electronic device 100.

In order to request information (Table 1) on one or more grids extracted from the server 200, the electronic device 100 requests valid grid information which exists in a corresponding patch as shown in Table 2 below.

TABLE 2

| MCC | Mobile country code |
|---|---|
| MNC | Mobile network code |
| RAT | Kind of RAT |
| LAC | Location area code |
| Cell ID | serving Cell ID |
| Patch version | Patch version (yyyymmdd) |
| Patch Index | Patch Index (Lat, Lon) |
| NumLimit | Number of returned grids (e.g., 1000) |

When the position of the electronic device 100 is tracked, the server 200 extracts grid information using the information of the first radio station, the information of the second radio station, and a patch index, and transmits the extracted grid information to the electronic device 100.

In step 21, the electronic device 100 measures the position of the electronic device 100 on the basis of the grid information received from the server 200.

Figure 6:
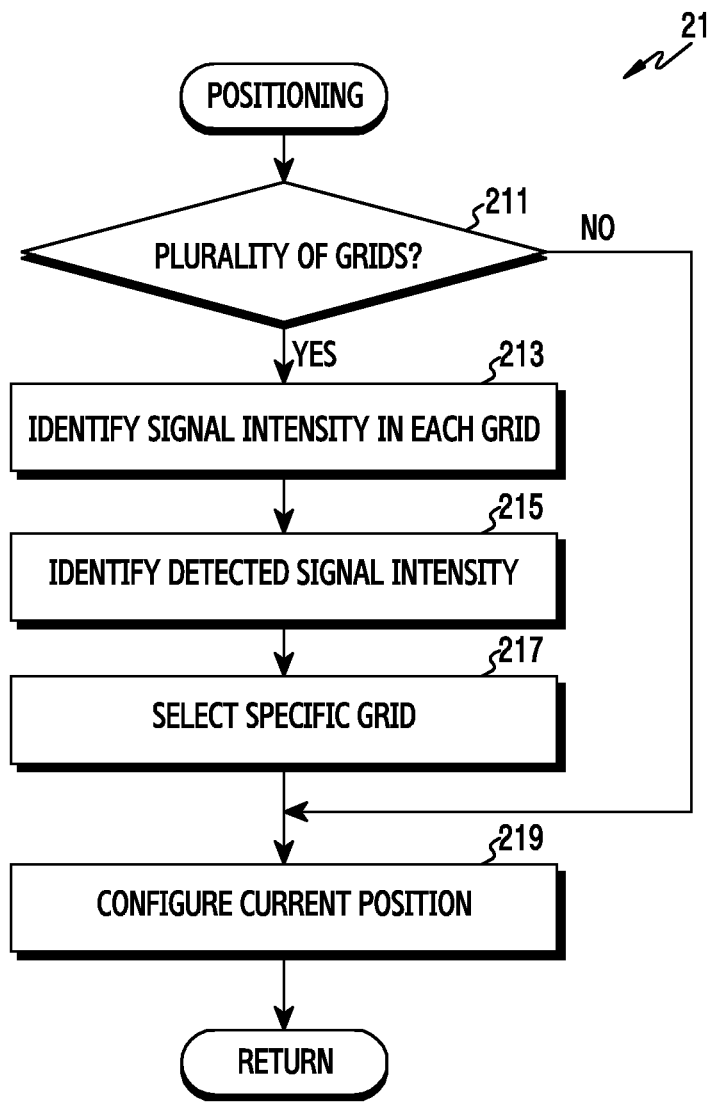
FIG. 6 is a flowchart of a method of measuring a position of an electronic device using grid information by the electronic device, according to an embodiment of the present disclosure.

FIG. 6 is a flowchart of a method of measuring a position of an electronic device using grid information by the electronic device, according to an embodiment of the present disclosure.

Referring to FIG. 6, in step 211, the electronic device 100 identifies whether the grid information received from the server 200 corresponds to information on a plurality of grids.

As a result of the identification in step 211, when the grid information received from the server 200 does not correspond to the information on the plurality of grids, the electronic device 100 performs step 219.

In step 219, the electronic device 100 identifies the position of the electronic device 100 on the basis of a position of a grid corresponding to the grid information received from the server 200, and performs step 23. In this event, the electronic device 100 identifies the position of the electronic device 100 as a grid point corresponding to the grid.

According to the embodiment, the electronic device 100 identifies a spacing distance between the grid point and a current position of the electronic device 100, using Equation (4) below. The electronic device 100 identifies the position of the electronic device 100 using the identified spacing distance on the basis of the grid point.

$$\eta_g = E\left[\frac{1}{N}\sum_{i=1}^{N}\Delta_{g,i}|\gamma_i - \Gamma_{g,i}|\right] \quad \text{Equation (4)}$$

where N refers to the number of radio stations transmitting a communication signal identified in the grid point, $\gamma_i$ refers to a communication signal intensity (dB unit) in a specific position where a communication signal which is being transmitted from the i-th radio station is detected, $\Gamma_{g,i}$ refers to a communication signal intensity at a specific grid point where the communication signal which is being transmitted from the i-th radio station is detected, and $\Delta_{g,i}$ refers to a scaling factor by a communication signal intensity, an antenna gain, and a reception electronic field in the grid point where the communication signal which is being transmitted from the i-th radio station is detected, and refers to different values applied according to the position of the electronic device 100 or for each radio station. As a result of the identification in step 211, when the grid information received from the server 200 corresponds to the information on the plurality of grids, the electronic device 100 performs step 213.

In step 213, the electronic device 100 identifies at least one signal intensity of the intensity of the first communication signal and the intensity of the second communication signal which are identified in the plurality of grids.

According to an embodiment, when information of the radio station, which is transmitted to the server 200 in step 15, corresponds to information on three or more first radio stations, the electronic device 100 identifies the intensity of the first communication signal in the grid.

According to an embodiment, when the information of the radio station, which is transmitted to the server 200 in step 15, corresponds to information on at least one second radio station, the electronic device 100 identifies the intensity of the first communication signal and the intensity of the second communication signal in the grids.

In step 215, the electronic device 100 identifies signal intensities for at least one communication signal of the first communication signal and the second communication signal which are detected in the electronic device 100, and perform step 217.

In step 217, the electronic device 100 selects a specific grid among grids on the basis of an intensity of the communication signal identified in the grids, and an intensity of the communication signal detected by the electronic device 100.

According to an embodiment, the electronic device 100 configures, as a specific grid, a grid in which a difference between the intensity of the communication signal identified in the grids and the intensity of the communication signal detected by the electronic device 100 is near to 0. The electronic device 100 identifies the configured specific grid as a current position of the electronic device 100.

The electronic device 100 identifies, using Equation (5) below, a set of association grids in which a difference between the intensity of the communication signal identified in the grids and the intensity of the communication signal detected by the electronic device 100 is the smallest. For example, when a signal intensity obtained by the electronic device 100 from n radio stations transmitting the communication signal is $\{\gamma_i\}_{i=1,\ldots,N}$, the electronic device 100 identifies a set of grids which is closest to the electronic device 100 using Equation (5) below.

$$\hat{\Phi}_i^{\hat{\kappa}} = \{g \in S_i | E[d_i] \le \hat{\kappa}\}$$

where $$d_i = \Delta_{g,i} |\gamma_i - \Gamma_{g,i}|\}$$  Equation 5 where $S_i$ refers to a set of all grid points receiving a communication signal which is being transmitted from the i-th radio station, $\gamma_i$ refers to a communication signal intensity (dB unit) in a specific position where a communication signal which is being transmitted from the i-th radio station is received, $\Gamma_{g,i}$ refers to a communication signal intensity at a specific grid point where the communication signal which is being transmitted from the i-th radio station is received, $\hat{\kappa}$ refers to a value of a dB unit for configuring the number of grids located in an area where a coverage of the communication signal transmitted from the radio station is overlapped, and $\Delta_{g,i}$ refers to a scaling factor by a communication signal intensity, an antenna gain, and a reception electronic field in the grid point where the communication signal which is being transmitted from the i-th radio station is received, and refers to different values applied according to the position of the electronic device 100 or for each radio station.

Equation (6) indicates a value of $\hat{\kappa}$ when the number of grids having information on the radio station corresponds to c. In this event, C may be configured as a value greater than 1.

$$\text{minimize } \hat{\kappa} \text{ subject to } |\Phi_i^{\hat{\kappa}}| \le c$$  Equation (6)

Equation (7) indicates an intersection of grid points at which a difference between signal intensities obtained from n radio stations is less than or equal to $\hat{\kappa}$.

$$\hat{\Psi}^{\hat{\kappa}} = \bigcap_{i=1,\ldots,N} \hat{\Phi}_i^{\hat{\kappa}}$$  Equation (7)

Equation (8) indicates the value of $\hat{\kappa}$ used to configure, as c, the number of grids existing in the area where the coverage of the communication signal is overlapped. When the value of $\Delta_{g,i}$ has not been optimized, the value of $\hat{\kappa}$ may be optimized through Equation (8).

$$\text{minimize } \hat{\kappa} \text{ subject to } |\hat{\Psi}^{\hat{\kappa}}| \ge c$$  Equation (8)

In Equation (9), when at least one grid existing in the overlapped area is identified, a grid point for a grid which is closest to the electronic device 100 may be identified using a signal intensity. In this event, when $\hat{\kappa}$, in which N is larger than or equal to 3 and c=1, is used through Equation (7), one only grid point may be obtained. When a plurality of grids are included in $\hat{\Psi}^\kappa$ as a result of Equation (5), the electronic device 100 identifies a specific grid using Equation (9).

$$\hat{P} = \underset{g \in \hat{\Psi}^{\hat{\kappa}}}{\arg\min} \eta_g$$  Equation (9)

The electronic device 100 measures a position of the electronic device 100 as a position for the specific grid. The electronic device 100 identifies the position of the electronic device 100 by applying a weighted value to be in inverse proportion to a value of $\eta_g$. In this event, the electronic device 100 configures the weighted value such that the smaller a difference between the signal intensity of the electronic device and the signal intensity of the specific grid is, the closer to the specific grid the electronic device is.

The electronic device 100 identifies a spacing distance between the grid point for the specific grid and a current position of the electronic device 100, using Equation (4). In this event, the electronic device 100 identifies the position of the electronic device 100 using the spacing distance identified on the basis of the grid point.

In step 219, the electronic device 100 configures the identified position of the electronic device 100 as a current position of the electronic device 100, and perform step 23.

Referring back to FIG. 4, in step 23, the electronic device 100 displays the position of the electronic device 100, which is identified in step 21.

Figure 7:
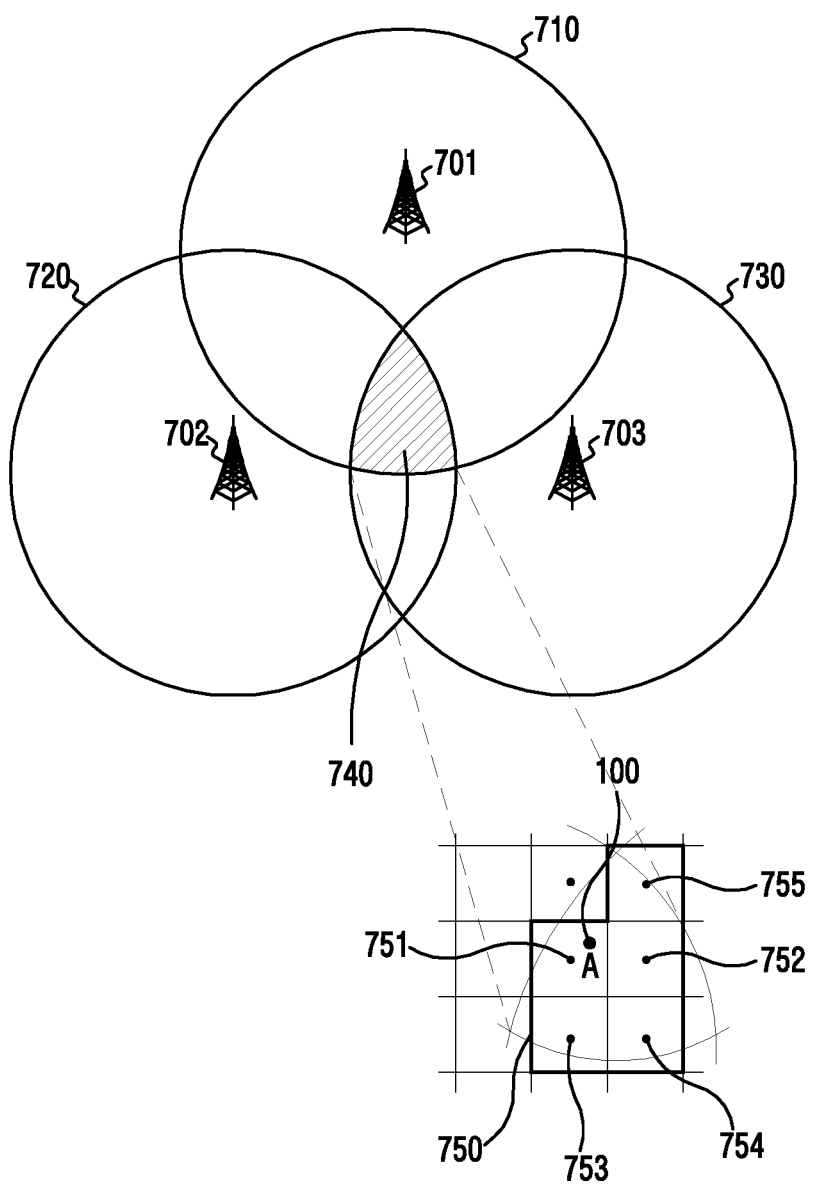
FIG. 7 illustrates a method of identifying a grid including a position of an electronic device using a communication signal transmitted from radio stations of identical communication networks, according to an embodiment of the present disclosure.

FIG. 7 illustrates a method of identifying a grid including a position of an electronic device using a communication signal transmitted from radio stations of identical communication networks, according to an embodiment of the present disclosure.

Referring to FIG. 7, an electronic device 100 accesses a serving radio station 701 among first radio stations 701, 702, and 703. The electronic device 100 identifies an intensity of a first communication signal transmitted from the serving radio station 701, and identifies identification information of the serving radio station 701. The electronic device 100 identifies the intensity of the first communication signal transmitted from neighbor radio stations 702 and 703. The electronic device 100 identifies the intensity of the first communication signal transmitted from neighbor radio stations 702 and 703. As shown, the electronic device 100 is located in an area 740 where a coverage 710 of the first communication signal transmitted from the serving radio station 701 and coverages 720 and 730 of the first communication signal transmitted from the neighbor radio stations 702 and 703 are overlapped.

When the electronic device 100 transmits information of the serving radio station 701 and the neighbor radio stations 702 and 703 to the server 200, the server 200 identifies that the electronic device 100 is located in the overlapped area 740 where all the first communication signals transmitted from the serving radio station 701 and the neighbor radio stations 702 and 703 can be detected. The server 200 extracts grid information on the area 740 where the coverages of the first communication signals are overlapped and then transmits the grid information to the electronic device 100.

When there are a plurality of grids for the overlapped area 740, the electronic device 100 extracts information on a set 750 of the plurality of grids and then transmits the extracted information to the electronic device 100. Further, when there is one grid for the overlapped area 740, the electronic device 100 extracts information on the one grid and then transmits the extracted information to the electronic device 100.

The electronic device 100 identifies an intensity of the first communication signal in grids 751, 752, 753, 754, and 755 included in the set 750 of grids. The electronic device 100 detects the intensities of the first communication signals transmitted from the serving radio station 701 and the neighbor radio stations 702 and 703, respectively.

The electronic device 100 compares an intensity of the first communication signal identified in the grid and an intensity of the first communication signal detected by the electronic device 100. In this event, the electronic device 100 compares signals transmitted from the same radio stations.

According to an embodiment, the electronic device 100 obtains a difference between intensities of the first communication signals identified in the plurality of grids 751, 752, 753, 754, and 755 and an intensity of the first communication signal detected at a current position A of the electronic device 100, thereby extracting a grid in which a differential value is the smallest. The electronic device 100 configures, as a specific grid 751, the grid in which the differential value is the smallest.

The electronic device 100 calculates a spacing distance between a grid point of the specific grid 751 and the electronic device 100 using the value obtained by a difference between the intensity of the first communication signal of the specific grid 751 and the intensity of the first communication signal detected by the electronic device 100. The electronic device 100 identifies a position of the electronic device 100 using the calculated spacing distance.

Figure 8:
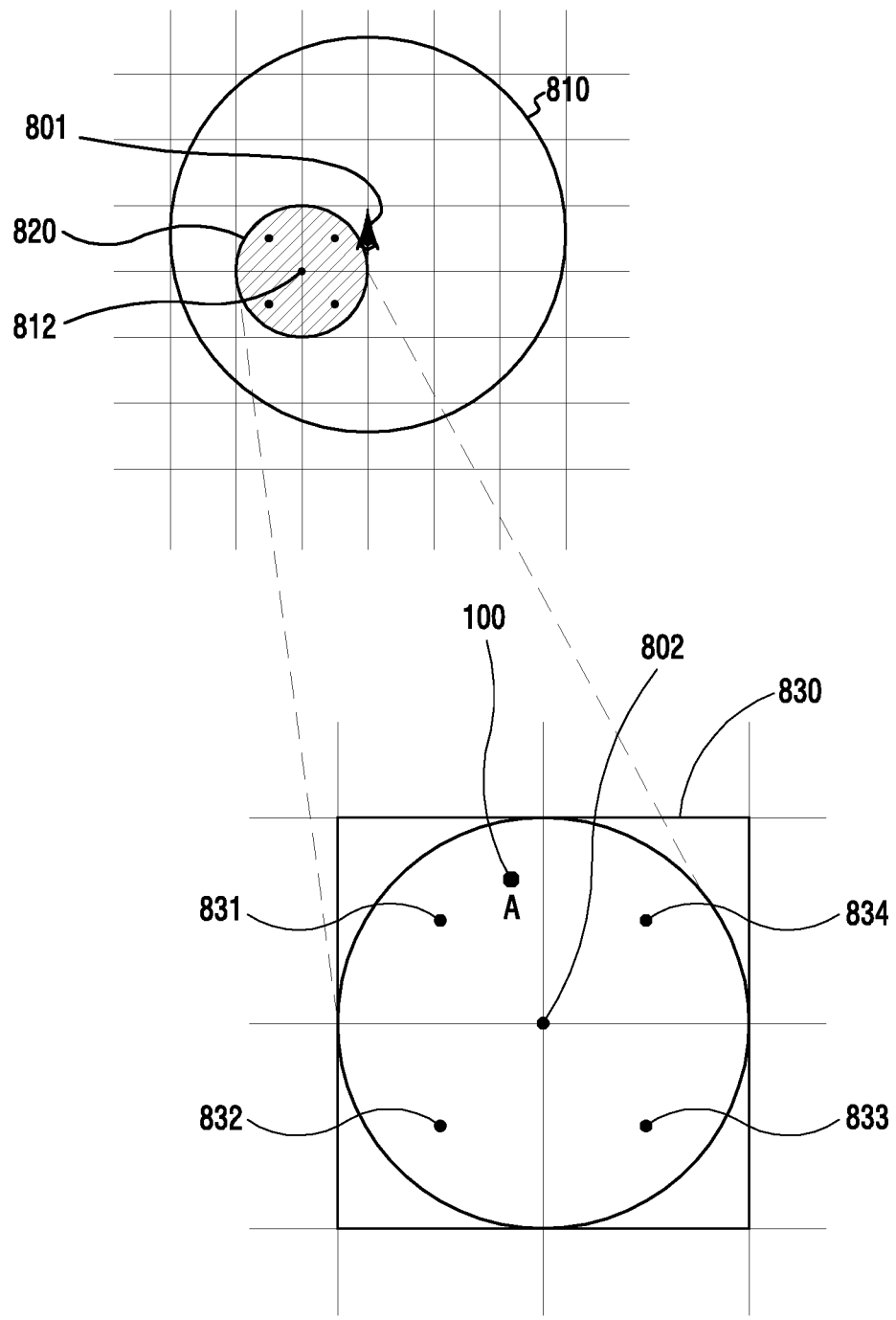
FIG. 8 illustrates a method of identifying a grid including a position of an electronic device using a communication signal transmitted from radio stations of different communication networks, according to an embodiment of the present disclosure.

FIG. 8 illustrates a method of identifying a grid including a position of an electronic device using a communication signal transmitted from radio stations of different communication networks, according to an embodiment of the present disclosure.

Referring to FIG. 8, an electronic device 100 accesses a serving radio station 801 which is a first radio station transmitting a first communication signal. The electronic device 100 detects a second communication signal transmitted from a second radio station 802. As shown, the electronic device 100 is located in an area 820 where a coverage 810 of a first communication signal transmitted from the server radio station 801 and a coverage 820 of the second communication signal transmitted from the second radio station 802 are overlapped.

When the electronic device 100 transmits information of the serving radio station 801 and the second radio station 802 to the server 200, the server 200 identifies, using the information, that the electronic device 100 is located in an area 820 where the coverage 810 of the first communication signal and the coverage 820 of the second communication signal are overlapped. The server 200 extracts grid information on the overlapped area 820 and then transmits the grid information to the electronic device 100.

When there are a plurality of grids for the overlapped area 820, the electronic device 100 extracts information on a set 830 of the plurality of grids and then transmits the extracted information to the electronic device 100. Further, when there is one grid for the overlapped area 820, the electronic device 100 extracts information on one grid and then transmits the extracted information to the electronic device 100.

The electronic device 100 identifies an intensity of the first communication signal and an intensity of the second communication signal in grids 831, 832, 833, and 834 included in the set 830 of grids. The electronic device 100 compares the intensities of the first communication signals identified in the grids 831, 832, 833, and 834 and an intensity of the first communication signal detected by the electronic device 100. The electronic device 100 compares the intensities of the second communication signals identified in the grids 831, 832, 833, and 834 and an intensity of the second communication signal detected by the electronic device 100.

According to an embodiment, the electronic device 100 obtains a difference between an intensity of the first communication signal identified in each of the plurality of grids 831, 832, 833, and 834 and an intensity of the first communication signal detected at a current position A of the electronic device 100, thereby extracting a grid point in which a differential value is the smallest. According to an embodiment, the electronic device 100 obtains a difference between an intensity of the second communication signal identified in each of the plurality of grids 831, 832, 833, and 834 and an intensity of the second communication signal detected at a current position A of the electronic device 100, thereby extracting a grid point in which a differential value is the smallest. The electronic device 100 configures, as a specific grid 831, the grid in which the differential value is the smallest.

The electronic device 100 calculates a spacing distance between a grid point of the specific grid 831 and the electronic device 100 using the value obtained by a difference between the intensities of the first and second communication signals of the specific grid 831 and the intensities of the first and second communication signals which are detected in the electronic device 100. The electronic device 100 identifies a position of the electronic device 100 using the calculated spacing distance.

Figure 9:
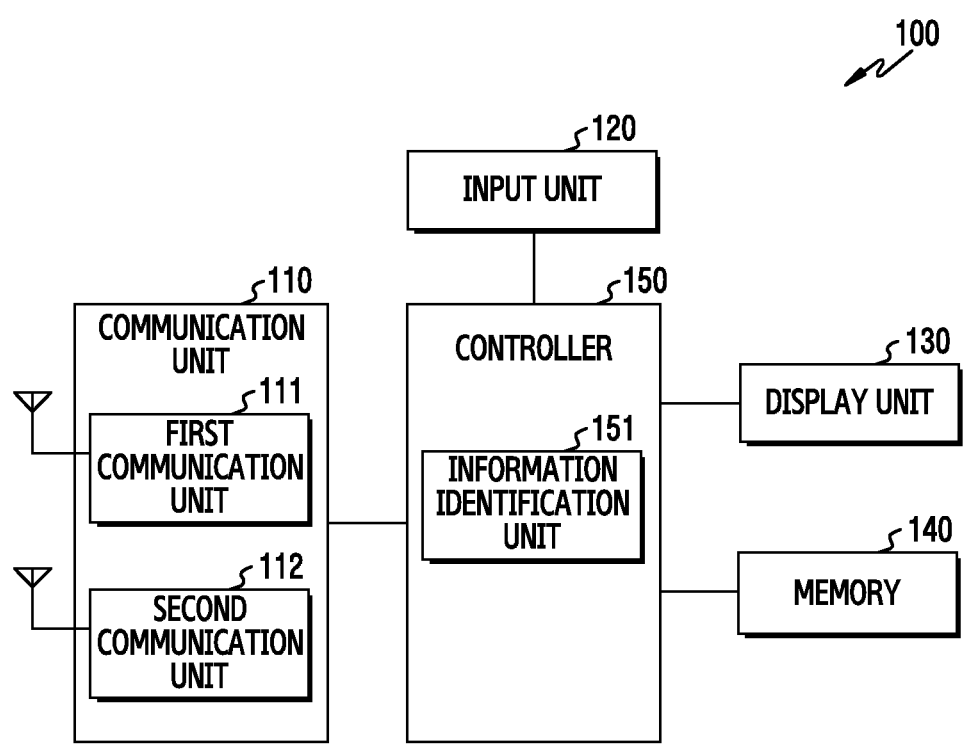
FIG. 9 is a block diagram of a configuration of an electronic device for measuring a position using a communication signal transmitted from radio stations of different communication networks, according to another embodiment of the present disclosure.

FIG. 9 is a block diagram of a configuration of an electronic device for measuring a position using a communication signal transmitted from radio stations of different communication networks, according to another embodiment of the present disclosure.

Referring to FIG. 9, an electronic device 100 according to another embodiment of the present disclosure includes a communication unit 110, an input unit 120, a display unit 130, a memory 140, and a controller 150.

The communication unit 110, the input unit 120, the display unit 130, and the memory 140 of FIG. 9 are identical to the communication unit 110, the input unit 120, the display unit 130, and the memory 140 which are shown in FIG. 2, and thus, a detailed description will be omitted.

The controller 150 of FIG. 9 is identical to the controller 150 shown in FIG. 3, except that the controller 150 of FIG. 9 does not include the position identification unit 152.

Figure 10:
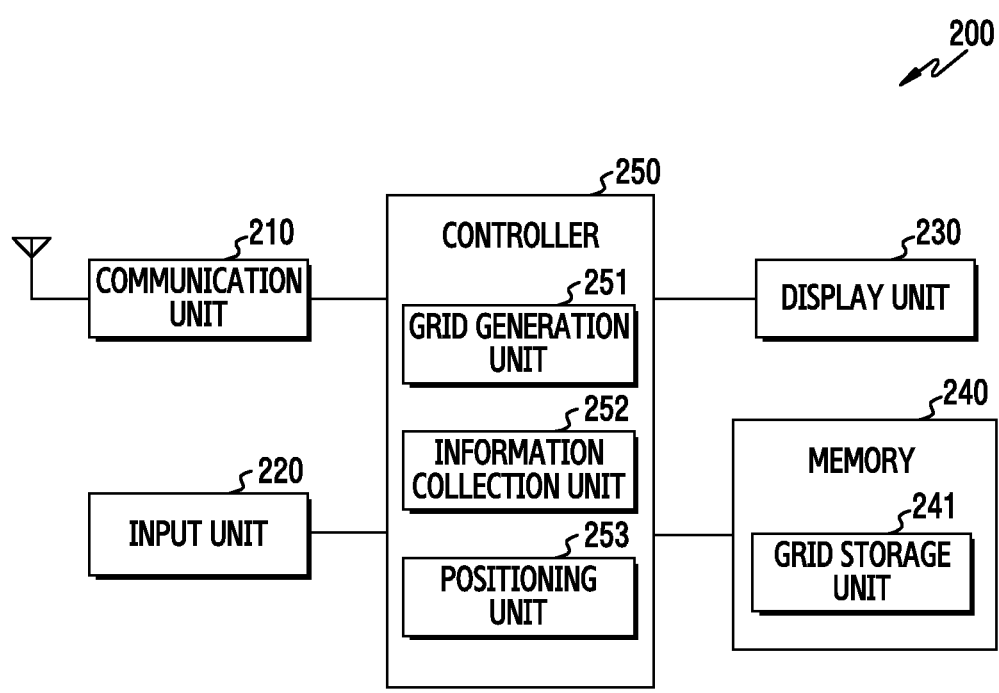
FIG. 10 is a block diagram of a configuration of a server for measuring a position of an electronic device using a communication signal transmitted from radio stations of different communication networks, according to another embodiment of the present disclosure.

FIG. 10 is a block diagram of a configuration of a server for measuring a position of an electronic device using a communication signal transmitted from radio stations of different communication networks, according to another embodiment of the present disclosure.

Referring to FIG. 10, a server 200 according to another embodiment of the present disclosure includes a communication unit 210, an input unit 220, a display unit 230, a memory 240, and a controller 250.

The communication unit 210, the input unit 220, the display unit 230, and the memory 240 of FIG. 10 are identical to the communication unit 210, the input unit 220, the display unit 230, and the memory 240 which are shown in FIG. 3, and thus, a detailed description will be omitted.

The memory 240 stores programs for identifying a position of the electronic device 100.

The controller 250 of FIG. 10 is identical to the controller 250 shown in FIG. 3, with the exception that the controller 250 of FIG. 10 additionally includes a positioning unit 253.

When information of a plurality of radio stations has been received from the electronic device 100, the positioning unit 253 identifies identification information of a radio station in the received information of the radio station. The positioning unit 253 extracts grid information included in coverage of a communication signal transmitted from the radio station.

The positioning unit 253 identifies the position of the electronic device 100 on the basis of the extracted grid information. According to an embodiment, when the extracted grid information corresponds to information on one grid, the positioning unit 253 configures the position of the grid as the position of the electronic device 100.

For example, the positioning unit 253 identifies intensities of communication signals in the grids. The positioning unit 253 identifies the intensities of communication signals detected by the electronic device 100. The positioning unit 253 obtains a difference between intensities of communication signals identified in the grids and the intensities of communication signals detected by the electronic device 100. The positioning unit 253 calculates a spacing distance between a grid point corresponding to the grid and the electronic device 100, using the calculated differential value. The positioning unit 253 identifies a position of the electronic device 100 using the calculated spacing distance.

According to an embodiment, when the extracted grid information corresponds to information on a plurality of grids, the positioning unit 253 extracts a specific grid from the plurality of grids. The positioning unit 253 configures the position of the extracted specific grid as the position of the electronic device 100.

For example, the positioning unit 253 identifies intensities of communications signals in the plurality of grids. The positioning unit 253 identifies the intensities of communication signals detected by the electronic device 100. The positioning unit 253 obtains a difference between intensities of communication signals in the grids and intensities of communication signals detected by the electronic device 100. The positioning unit 253 extracts a grid, in which the calculated differential value is the smallest, as a specific grid. The positioning unit 253 calculates a spacing distance between a grid point for the specific grid and the electronic device 100, using the calculated differential value. The positioning unit 253 identifies a position of the electronic device 100 using the calculated spacing distance. When the position of the electronic device 100 is identified, the positioning unit 253 transmits a result of the identification to the electronic device 100.

Figure 11:
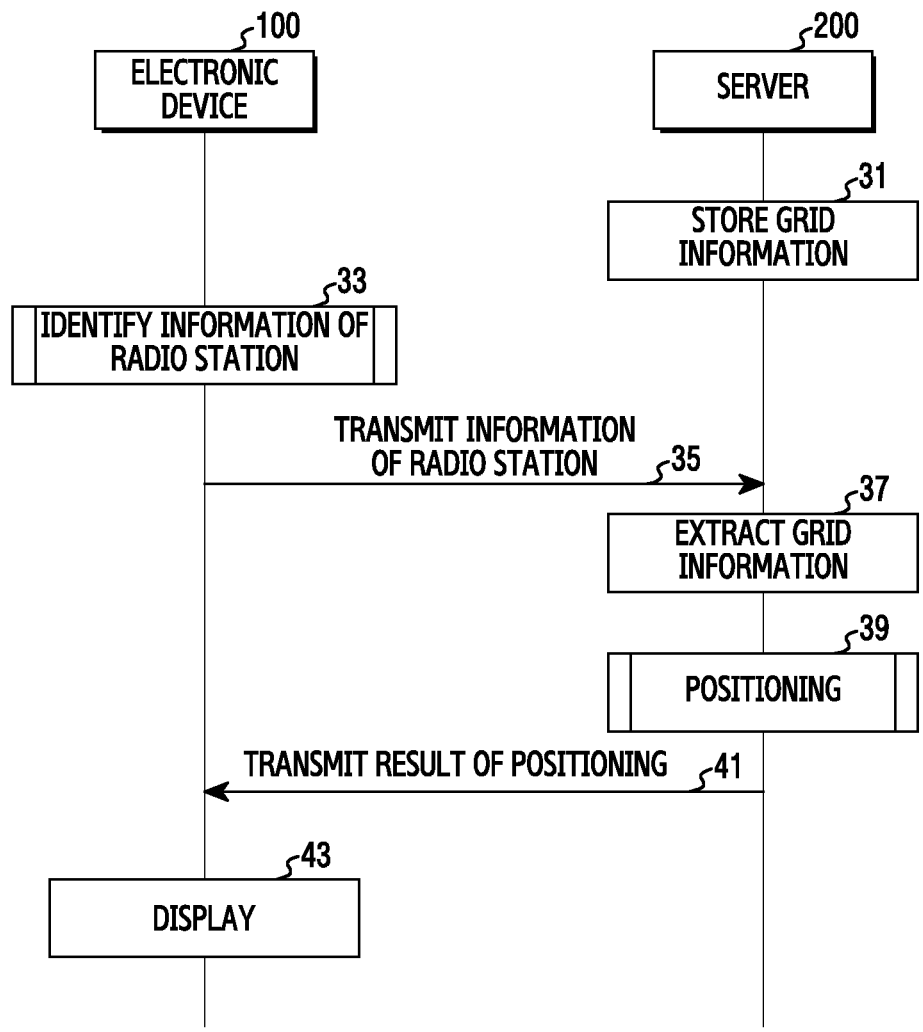
FIG. 11 is a flowchart of a method of measuring a position of an electronic device using a communication signal transmitted from radio stations of different communication networks, according to another embodiment of the present disclosure.

FIG. 11 is a flowchart of a method of measuring a position of an electronic device using a communication signal transmitted from radio stations of different communication networks, according to an embodiment of the present disclosure.

Referring to FIG. 11, in step 31, a server 200 stores grid information. The server 200 generates a grid DB as the grid information. Step 31 is identical to step 11 of FIG. 4, and thus, a detailed description will be omitted.

In step 33, the electronic device 100 identifies information of a radio station.

Figure 12:
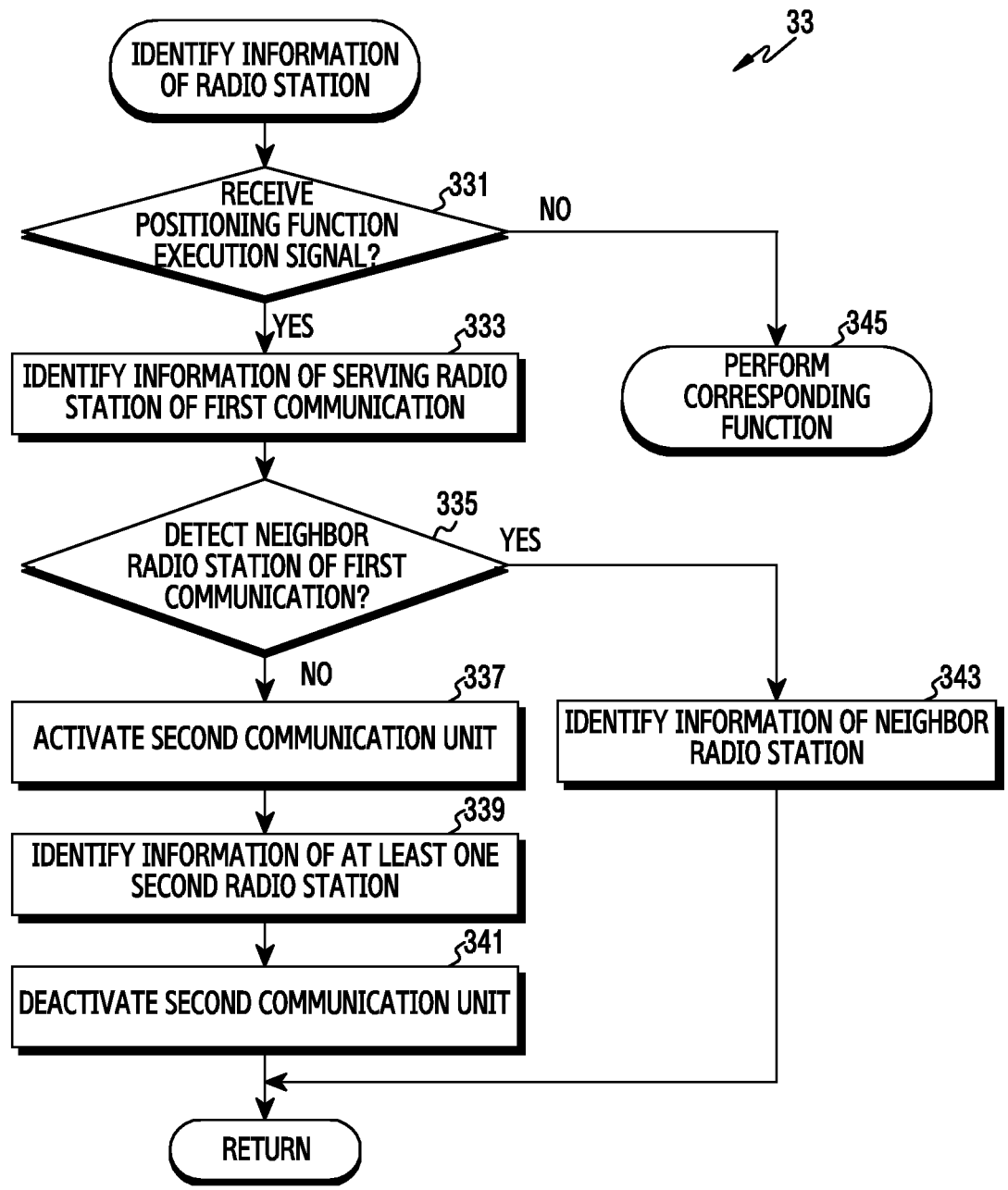
FIG. 12 is a flowchart of a method for identifying information of radio stations transmitting different communication signals by an electronic device, according to another embodiment of the present disclosure.

FIG. 12 is a flowchart of a method for identifying information of radio stations transmitting different communication signals by an electronic device, according to another embodiment of the present disclosure.

Referring to FIG. 12, steps 331, 333, 335, 337, 339, 341, 343, and 345 shown in FIG. 12 are identical to steps 131, 133, 135, 137, 139, 141, 143, and 145 shown in FIG. 5, and thus, a detailed description will be omitted.

Referring back to FIG. 11, in step 35, the electronic device 100 transmits the identified radio station information to the server 200. According an embodiment, in step 35, the electronic device 100 transmits information of three or more first radio stations to the server 200, or transmits, to the server 200, information of one first radio station and information of at least one second radio station.

In step 37, the server 200 extracts, from a grid DB, grid information corresponding to information on a radio station, received from the electronic device 100. Step 37 is identical to step 17 of FIG. 4, and thus, a detailed description will be omitted.

In step 39, the server 200 measures the position of the electronic device 100 on the basis of the extracted grid information.

Figure 13:
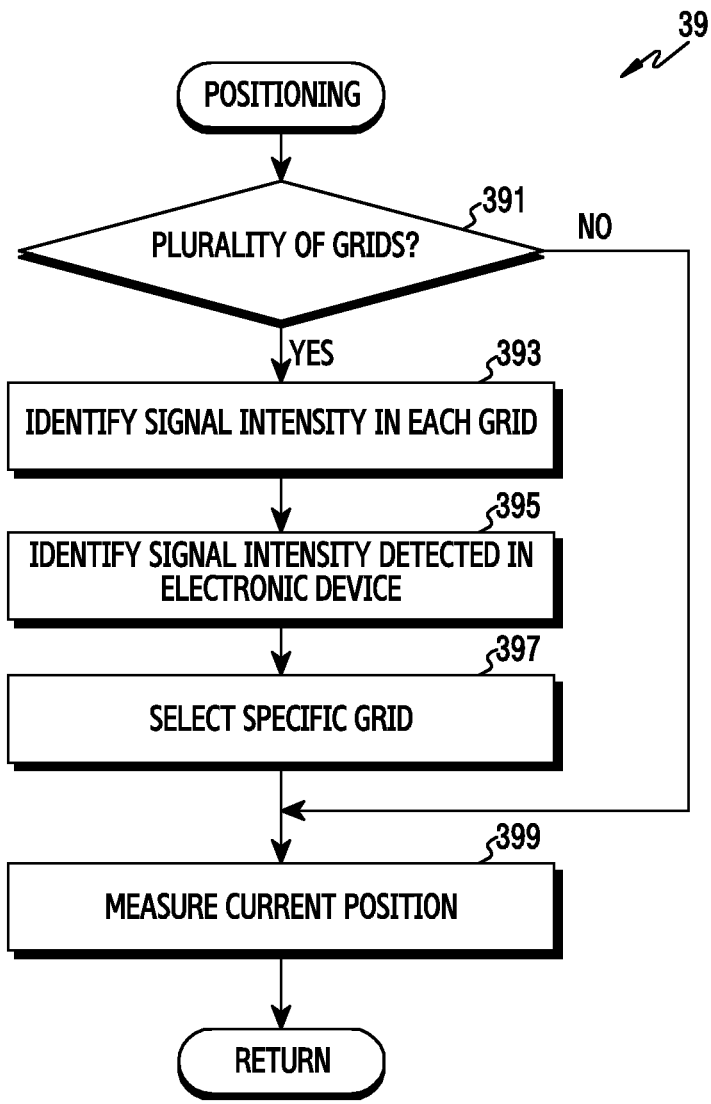
FIG. 13 is a flowchart of a method of measuring a position of an electronic device using grid information by a server, according to another embodiment of the present disclosure.

FIG. 13 is a flowchart of a method of measuring a position of an electronic device using grid information in a server, according to another embodiment of the present disclosure.

Referring to FIG. 13, in step 391, the server 200 identifies whether the extracted grid information corresponds to information on a plurality of grids.

As a result of the identification in step 391, when the extracted grid information does not correspond to the information on the plurality of grids, the server 200 performs step 399.

In step 399, the server 200 measures a position of a grid point included in the extracted grid information as the position of the electronic device 100, and performs step 41.

According to the embodiment, the server 200 identifies a spacing distance between the grid point and a current position of the electronic device 100, using Equation 4 above. In this event, the server 200 measures the position of the electronic device 100 using the identified spacing distance.

As a result of the identification in step 391, when the extracted grid information corresponds to the information on the plurality of grids, the server 200 performs step 393.

In step 393, the server 200 identifies information on the plurality of grids.

Steps 393, 395, 397, and 399 are identical to steps 213, 215, 217, and 219, of FIG. 6, with the exception that in steps 393, 395, 397, and 399 of FIG. 12 the server 200 is the agent for performing the steps, and thus, a detailed description of these steps will be omitted.

Referring back to FIG. 11, in step 41, the server 200 transmits an identification result of a measured position of the electronic device 100, to the electronic device 100.

In step 43, the electronic device 100 displays the position identification result received from the server 200.

Certain embodiments of the present disclosure are shown and described in this specification, and the drawings are presented in order to easily explain technical contents of the present disclosure, and to help comprehension of the present disclosure, but are not intended to limit the scope of the present disclosure. That is, it should be obvious to those skilled in the art to which the present disclosure belongs that different modifications can be achieved based on the technical spirit of the present disclosure. Therefore, the scope of the present disclosure is defined, not by the detailed description and embodiments, but by the following claims and their equivalents.

What is claimed is:

1. A method of an electronic device for measuring a position of the electronic device, the method comprising:
based on a received first communication signal corresponding to a first communication method, identifying a serving, radio station accessed by the electronic device from first radio stations transmitting the first communication signal;
determining whether a predetermined number or more of neighbor radio stations are identified from the first radio stations;

in response to determining that the predetermined number or more of neighbor radio stations are not identified, receiving a second communication signal corresponding to a second communication method different from the first Communication method, and based on the received second communication signal, identifying one or more second radio stations transmitting the second communication signal;

identifying at least one grid corresponding to the identified serving radio station included in the first radio stations and the identified one or more second radio stations from a plurality of grids; and determining one grid associated with the position of the electronic device from the at least one grid by comparing an intensity of the first communication signal corresponding to each grid of the at least one grid with an intensity of the first communication signal received by the electronic device and comparing an intensity of the second communication signal corresponding to each grid of the at least one grid with an intensity of the second communication signal received by the electronic device.

2. The method of claim 1, wherein identifying the position of the electronic device comprises:

when the identified at least one grid corresponds to one grid, identifying the one grid as the one grid associated with the position of the electronic device.

3. The method of claim 1, wherein determining whether the predetermined number or more of neighbor radio station are identified comprises:

identifying the predetermined number or more of neighbor radio stations according to a request for searching for the neighbor radio stations transmitting the first communication signal.

4. The method of claim 1, wherein identifying the one or more second radio stations further comprises:

identifying the one or more second radio stations according to a request for searching for the one or more second radio stations transmitting the second communication signal.

5. The method of claim 1, wherein determining the one grid associated with the position of the electronic device from the at least one grid further comprises:

calculating a first differential value between the intensity of the first communication signal corresponding to each arid and the intensity of the first communication signal received by the electronic device;

calculating, a second differential value between the intensity of the second communication signal corresponding to each grid and the intensity of the second communication signal received by the electronic device; and extracting a grid in which the first differential value and the second differential value is the smallest as the one grid associated with the position of the electronic device.

6. The method of claim 1, wherein the first communication method comprises a LTE (Long Term Evolution) communication method, and wherein the second communication method comprises a Wi-Fi (Wireless Fidelity) communication method.

7. An electronic device for measuring a position of the electronic device, the electronic device comprising:

a controller configured to:

based on a received first communication signal corresponding to a first communication method, identify a serving radio station accessed by the electronic device from first radio stations transmitting the first communication signal:

determine whether a predetermined number or more of neighbor radio stations are identified from the first radio stations;

in response to determining that the predetermined number or more of neighbor radio stations are not identified, receive a second communication signal corresponding to a second communication method different from the first communication method, and based on the received second communication signal, identify one or more second radio stations transmitting the second communication signal;

identify at least one grid corresponding to the identified serving radio station included in the first radio stations and the identified one or more second radio stations from a plurality of grids; and determine one grid associated with the position of the electronic device from the at least one grid by comparing an intensity of the first communication signal corresponding to each grid of the at least one grid with an intensity of the first communication signal received by the electronic device and comparing an intensity of the second communication signal corresponding to each grid of the at least one grid with an intensity of the second communication signal received by the electronic device.

8. The electronic device of claim 7, wherein the controller is further configured to:

when the identified at least one grid corresponds to one grid, identify the one grid as the one grid associated with the position of the electronic device.

9. The electronic device of claim 7, wherein the controller identifies the predetermined number or more of neighbor radio stations from the first radio stations or the one or more second radio stations according to a request for searching for the predetermined number or more of neighbor radio stations or the one or more second radio stations.

10. The electronic device of claim 7, wherein the controller is further configured to:

calculate a first differential value between the intensity of the first communication signal corresponding to each grid and the intensity of the first communication signal received by the electronic device;

calculate a second differential value between the intensity of the second communication signal corresponding to each grid and the intensity of the second communication signal received by the electronic device; and extract a grid in which the first differential value and second differential value is the smallest as the one grid associated with the position of the electronic device.

* * * * *